United States Patent Office 3,365,459
Patented Jan. 23, 1968

3,365,459
CERTAIN TETRAHYDRO PYRAZOLO-PYRIDINE AND PYRAZOLO-PIPERIDINE DERIVATIVES
Herbert Morton Blatter, Irvington, N.J., assignor to Ciba Corporation, New York, N.Y., a corporation of Delaware
No Drawing. Continuation-in-part of application Ser. No. 395,016, Sept. 8, 1964. This application Feb. 12, 1965, Ser. No. 432,416
22 Claims. (Cl. 260—296)

ABSTRACT OF THE DISCLOSURE

Bicyclic pyrazoles of the formula

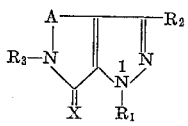

A=alkylene, alkenylene or alkanoylene with 2–3 ring-C
$R_1$ to $R_3$=H, aliphatic or aromatic radical
X=$H_2$, H+alkyl, alkyl$_2$ or O their 2-$R_1$-isomers, N-oxides, quarternaries and salts, e.g. the 1-(4-fluoro-phenyl) - 3 - ethyl-6-phenyl-7-oxo-4,5,6,7-tetrahydro-2H-pyrazolo[3,4-c]pyridine, exhibit anti-inflammatory effects.

This application is a continuation-in-part of my application Ser. No. 395,016, filed Sept. 8, 1964.

The present invention concerns and has for its object the provision of bicyclic pyrazole compounds having the formulae

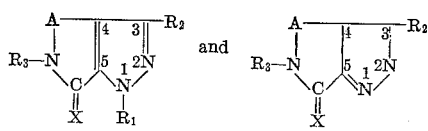

in which A stands for lower alkylene, alkanoylene or alkenylene separating the nitrogen atom from the 4-position by 2 or 3 ring-carbon atoms, each of $R_1$, $R_2$ and $R_3$ stands for hydrogen or an aliphatic or aromatic radical and X for two hydrogens or lower alkyls, hydrogen and lower alkyl or oxo, N-oxides and quaternary ammonium derivatives thereof and salts of these compounds, as well as methods for their preparation.

A lower alkylene group A represents, for example, 1,2-ethylene, 1,2- or 1,3-propylene, 1,2-, 1,3- or 2,3-butylene, 1,2-, 1,3-, 2,3- or 2,4-pentylene, 2,3-, 2,4- or 3,4-hexylene, 3,5-heptylene, 2-methyl-1,3-butylene, 2-methyl-2,3-propylene, 2,2-dimethyl-1,3-propylene or 3-ethyl-2,4-pentylene. Lower alkanoylene representing A is, for example, ethanoylene (—CO—CH$_2$—), 1,2- or 1,3-propanoylene, 1,2- or 1,3-butanoylene, 1,2- or 1,3-pentanoylene, 2-methyl-1,2-propanoylene, 2-methyl-1,3-butanoylene or 2-ethyl-1,3-propanoylene. Finally, a lower alkenylene group A represents, for example, 1,2-ethenylene, 1-propenylene - (1,2) or -(1,3), 1-butenylene-(1,2) or -(1,3) 2-butenylene - (2,3), 2 - pentenylene-(2,4) or 2 - methyl - 1 - butenylene-(1,3). Said radicals may be connected to the nitrogen atom either by the frontal or terminal end of the chain.

An aliphatic radical representing $R_1$, $R_2$ and/or $R_3$ is, for example, alkyl, particularly lower alkyl, e.g. methyl, ethyl, n-propyl, isopropyl, n-butyl, isobutyl, n-pentyl, n-hexyl or n-heptyl, as well as higher alkyl, e.g. n-octyl, n-nonyl, n-decyl, n-undecyl or n-dodecyl, alkenyl, such as lower alkenyl, e.g. allyl, cycloalkyl or cycloalkyl-lower alkyl having from three to eight, preferably from five to six, ring carbon atoms, e.g. cyclopropyl, cyclopentyl, cyclohexyl, or cycloheptyl, cyclopropyl-methyl, cyclopentyl-methyl, 3-cyclopentyl-propyl, cyclohexyl-methyl, 2-cyclohexyl-ethyl or cycloheptylmethyl, cycloalkenyl or cycloalkenyl-lower alkyl having from five to eight, preferably from five to six, ring carbon atoms, e.g. 1-cyclopentenyl, 1-cyclohexenyl, 3-cyclohexenyl, 1-cycloheptenyl, 3 - cycloheptenyl or 1-cyclooctenyl, 1 - cyclopentenyl-methyl, 1 - cyclohexenyl-methyl or 2 - (3-cyclohexenyl)-ethyl, or an araliphatic group, particularly monocyclic carbocyclic aryl-lower alkyl, e.g. benzyl, 1-phenyl-ethyl, 2-phenyl-ethyl or substituted phenyl-lower alkyl, as well as bicyclic carbocyclic aryl-lower alkyl, e.g. 1-naphthyl-methyl, 2-naphthyl-methyl or substituted naphthyl-lower alkyl, or monocyclic heterocyclic aryl-lower alkyl, especially monocyclic azacyclic aryl-lower alkyl, e.g. 2-pyridyl-methyl, 4-pyridyl-methyl or substituted pyridyl-lower alkyl.

An aromatic radical representing $R_1$, $R_2$ and/or $R_3$ is, more especially, monocyclic or bicyclic carbocyclic or heterocyclic aryl, e.g. phenyl, substituted phenyl, naphthyl or substituted naphthyl; aza-, thia- or oxacyclic aryl, for example, pyridyl, e.g. 2-, 3- or 4-pyridyl or substituted pyridyl, thienyl, e.g. 2-thienyl or substituted thienyl, or furyl, e.g. 2-furyl or substituted furyl.

The above radicals representing $R_1$, $R_2$ and/or $R_3$ may have one or more than one of the same or of different substituents attached to any of the positions available for substitution. Such substituents are, for example, lower alkyl, e.g. methyl, ethyl, n-propyl, isopropyl or n-butyl, hydroxy, etherified hydroxy, especially lower alkoxy, e.g. methoxy, ethoxy, n-propoxy or n-butoxy, esterified hydroxy, especially halogeno, e.g. fluoro, chloro or bromo, trifluoromethyl, etherified mercapto, especially lower alkylmercapto, e.g. methylmercapto or ethylmercapto, amino, such as tertiary amino, for example, di-lower alkylamino, e.g. dimethylamino or diethylamino, alkyleneimino containing from four to seven ring-carbon atoms, e.g. pyrrolidino, piperidino or 1,6-hexyleneimino, carboxy or carbo-lower alkoxy, e.g. carbomethoxy or carbethoxy.

Substituted aliphatic or aromatic radicals representing $R_1$, $R_2$ and/or $R_3$ are, more especially, hydroxy-lower alkyl, lower alkoxy-lower alkyl, di-lower alkylamino-lower alkyl, or alkyleneimino-lower alkyl containing from four to seven ring-carbon atoms; in these groups the substituent is separated from the nitrogen carrying $R_1$ or $R_3$ by at least two carbon atoms. Furthermore, (lower alkyl)-phenyl-lower alkyl, (lower alkoxy)-phenyl-lower alkyl, (halogeno)-phenyl-lower alkyl, (trifluoromethyl)-phenyl-lower alkyl, (lower alkylmercapto)-phenyl-lower alkyl or (di-lower alkylamino)-phenyl-lower alkyl, but more especially, (lower alkyl)-phenyl, (lower alkoxy)-phenyl, (halogeno)-phenyl, (tri-fluoromethyl)-phenyl, (lower alkylmercapto)-phenyl or (di-lower alkylamino)-phenyl, as well as (lower alkyl)-pyridyl.

The radical $R_2$ more particularly stands for lower alkyl, phenyl or substituted phenyl and $R_3$ more especially for phenyl, substituted phenyl, pyridyl or substituted pyridyl, examples of which have been given above.

The compounds of this invention posses valuable pharmacological properties. For example, they exhibit anti-inflammatory activity and are, therefore, useful as anti-inflammatory agents, for example in place of corticosteroids, e.g. cortisone or hydrocortisone and the like, an the treatment of tissue inflammations, such as arthritic inflammations or similar conditions.

Furthermore, the compounds of this invention are useful starting materials or intermediates in the manufacture of other valuable compounds, especially medicines.

Particularly useful are compounds of the above formulae in which A stands for lower alkylene or alkanoylene separating the nitrogen atom from the 4-position by two ring-carbon atoms, $R_1$ for hydrogen, lower alkyl, cycloalkyl or cycloalkyl-lower alkyl having from five to six ring-carbon atoms, monocyclic carbocyclic aryl-lower alkyl, monocyclic carbocyclic aryl or monocyclic azacyclic aryl, $R_2$ for hydrogen, lower alkyl or monocyclic carbocyclic aryl, $R_3$ for hydrogen, monocyclic carbocyclic aryl or monocyclic azacyclic aryl and X for hydrogen or oxo, N-oxides and quaternary lower alkyl ammonium derivatives thereof and salts of these compounds.

Compounds that are especially valuable are those of the formulae

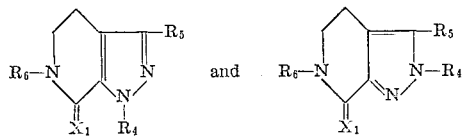

in which $X_1$ stands for hydrogen or oxo, $R_4$ for hydrogen lower alkyl, phenyl, (lower alkyl)-phenyl, (lower alkoxy)-phenyl, (halogeno)-phenyl, or (trifluoromethyl)-phenyl, $R_5$ for lower alkyl or phenyl and $R_6$ for phenyl, (lower alkyl)-phenyl, (lower alkoxy)-phenyl, (halogeno)-phenyl, or (trifluoromethyl)-phenyl, and acid addition salts thereof.

The compounds of the present invention are prepared according to methods in themselves known. For example the process for their preparation consists in:

(a) reacting a compound of the formula

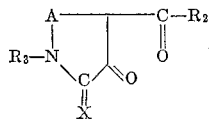

with the hydrazine $R_1$—NH—$NH_2$ or (b) reacting compounds of the formulae

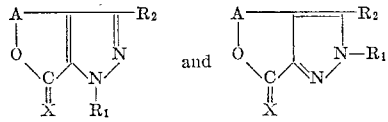

of which the ring-oxygen atom is connected with at least one carbonyl group, with the compound $R_3$—$NH_2$ or (c) condensing compounds of the formulae

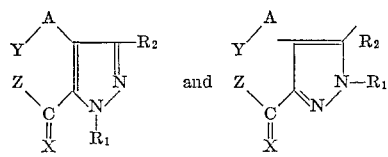

in which Y and Z are residues that react together to form an $R_3$-amino bridge by cyclization or (d) treating the oxime of the ketones having the formulae

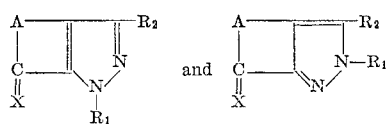

and containing only one carbonyl group either connected to the 5-position or being separated therefrom by one ring-carbon atom, or a sulfonic acid ester thereof, with a Beckmann rearrangement catalyst or (e) treating compounds of the formulae

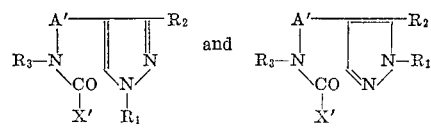

in which A' stands for alkylene and X' for hydrogen or lower alkyl, with a condensing agent and hydrogenating the condensation product or (f) treating compounds of the formulae

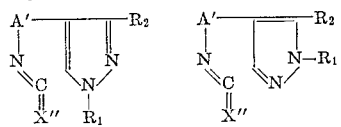

in which X" stands for two lower alkyls or hydrogen and lower alkyl, or an aliphatic quaternary immonium derivative thereof, with an acidic agent and, if desired, reducing a carbonyl or A-unsaturated compound obtained to the corresponding methylene or A-saturated compound respectively and/or substituting in a compound obtained that contains an unsubstituted ring-nitrogen atom the latter with an aliphatic or aromatic radical and/or converting a resulting compound into an N-oxide or quaternary ammonium derivative thereof and/or converting a base obtained into a salt thereof or a salt obtained into the corresponding base or into another salt and/or separating a resulting mixture of isomers into the single isomers.

The starting materials to be used in the intramolecular condensation (c) are advantageously selected so that one of the residues Y and Z is an at most $R_3$-monosubstituted amino group and the other is a free or reactively modified hydroxy group. The latter is above all a reactively esterified hydroxy group, for example such esterified with a strong inorganic acid, such as a hydrohalic acid, e.g. hydrochloric, hydrobromic or hydriodic acid, or a sulfonic acid, such as an alkane or benzene sulfonic acid, e.g. methane, ethane or p-toluene sulfonic acid.

A Beckmann rearrangement catalyst preferably is an acidic agent, for example a strong inorganic or organic acid or a halide thereof, such as hydrochloric, sulfuric, phosphoric or p-toluene sulfonic acid, boron trifluoride, phosphorus pentachloride or benzenesulfonyl chloride.

The condensing agent used in reaction (e) more especially is a hygroscopic agent commonly used in the Bischler-Napieralski synthesis, such as phosphorus pentoxide or phosphorus oxychloride. The following hydrogenation is carried out, for example with catalytically activated hydrogen, e.g. hydrogen in the presence of a palladium or nickel catalyst.

The acidic agent used in reaction (f) more especially is that used in the Pictet-Spengler synthesis such as a hydrohalic acid, e.g. hydrochloric acid, or may also be released from a salt.

The final products of this invention may be converted into each other by methods in themselves known. Thus, a resulting carbonyl compound can be reduced, for example, with a complex light metal hydride, such as an alkali metal aluminum hydride, e.g. lithium aluminum hydride, and/or in a resulting A-unsaturated compound the double bond may be saturated, for example as shown above.

In a resulting compound having an unsubstituted ring-nitrogen atom, the hydrogen can be replaced by an aliphatic radical by reaction with a reactive ester of an aliphatic alcohol, particularly an ester formed with a strong inorganic acid or organic sulfonic acid, e.g. those mentioned above. Suitable reactive esters are, for example, lower alkyl halides, monocyclic carbocyclic aryl-lower alkyl halides, di-lower alkyl sulfates, lower alkyl lower alkane sulfonates or lower alkyl benzene sulfonates. This reaction is preferably carried out with the starting material present in the form of a metal compound, particularly of an alkali metal, e.g. lithium or sodium salt. The latter is prepared by treating the resulting N-unsubstituted compound with a suitable metal salt-forming reagent, for example, with an alkali metal hydride e.g. sodium or potassium hydride. A methyl group may also be introduced by treating the N-unsubstituted compound with formaldehyde in the presence of a reducing reagent, e.g. formic acid, or in the presence of hydrogen and a hydrogenation catalyst, e.g. palladium. The introduction of an aromatic radical may be achieved with the use of an aryldiazonium salt, such as a benzenediazonium halide, e.g. benzene-, p-toluene-, 4-methoxy-benzene-, 4-fluoro-benzene- or 4-methoxy-3-methyl-benzene-diazonium chloride or bromide, or via an arine, i.e. reacting a compound generating it, such as 1-chloro-2-bromo-benzene, with lithium.

N-oxides of the compounds of the present invention are formed for example, by reaction with an N-oxidizing reagent, such as hydrogen peroxide, ozone, persulfuric acid, or more especially a percarboxylic or sulfonic acid, e.g. peracetic, perbenzoic, monoperphthalic or p-toluene persulfonic acid. In this reaction, an excess of the oxidation reagent and/or an increase in temperature should be avoided in order to prevent oxidative degradation.

Quaternary ammonium derivatives are prepared, for example, by treating the free compounds with a reactive ester of an alcohol, preferably of an aliphatic alcohol with especially a strong acid, such as one of the previously-mentioned esters. A resulting quaternary ammonium derivative may be converted into another quaternary ammonium compound, such as the hydroxide. The latter is, for example, obtained by reacting a quaternary ammonium halide with silver oxide, or a quaternary ammonium sulfate with barium hydroxide or by treating a quaternary ammonium salt with a hydroxyl ion exchange preparation or by electrodialysis.

The final products are obtained in the free form or in the form of their salts, depending on the conditions under which the process is carried out; the salts are also included in the present invention. Salts that are obtained can be converted into the free bases for example, by reacting them with a basic reagent, such as a metal hydroxide, e.g. sodium, potassium or calcium hydroxide, an alkali metal carbonate, e.g. sodium or potassium carbonate or hydrogen carbonate, ammonia or a hydroxyl ion exchange preparation.

A resulting salt may also be converted into another salt, for example by its treatment with a suitable anion exchange preparation. Furthermore, a salt with an inorganic acid may be reacted with a metal, e.g. sodium, barium or silver salt of an acid in a suitable diluent in which a resulting inorganic compound is insoluble and is thus removed from the reaction medium.

A free base is converted into a salt thereof, by its treatment with an acid or an anion exchange preparation. Preferred salts are those of therapeutically useful acids, such as inorganic acids, e.g. hydrochloric, hydrobromic, nitric, sulfuric or phosphoric acid or organic acids, such as carboxylic or sulfonic acids, e.g. acetic, propionic, glycolic, malonic, succinic, maleic, hydroxymaleic, fumaric, malic, tartaric, citric, glucuronic, benzoic, salicyclic, 4-aminosalicyclic, 2-acetoxybenzoic, pamoic, nicotinic, isonicotinic, methane, sulfonic, ethane sulfonic, ethane 1,2-disulfonic, 2-hydroxyethane sulfonic, benzene sulfonic, toluene sulfonic or naphthalene 2-sulfonic acid. Other acid addition salts are useful as intermediates for the preparation of the pure parent compounds or in the manufacture of other salts, as well as for identification or characterization purposes. Addition salts primarily used for the latter are, for example, those with certain inorganic acids, e.g. perchloric, phosphotungstic, phosphomolybdic, chloroplatinic or Reinecke acid or with acidic organic nitro compounds, e.g. picric, picrolonic or flavianic acid. The bases are converted into salts, the salts are separated and the bases liberated from the salts. In view of the close relationship between the free compounds and the compounds in the form of their salts, whenever a free base is referred to in this context, a corresponding salt is also intended, provided such is possible and useful.

Resulting mixtures of isomeric compounds may be separated into single isomers based, for example, on physico-chemical differences, such as different solubilities or different boiling points. Thus, mixtures of isomers or racemates may be separated by fractional crystallization or fractional distillation, if necessary, by using a derivative thereof, e.g. a salt. Racemic products can likewise be resolved into the optical antipodes, for example, by reaction with optically active acids, separation of the diasteromeric salts and liberation of the bases from the salts.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the present process in which an intermediate product obtainable at any stage thereof is used as starting material and any remaining step or steps is/are carried out or the process is discontinued at any stage thereof or in which the starting materials are formed in situ or the reactants are used in the form of their salts. The present reactions are preferably performed with starting materials that give rise to the preferred compounds mentioned above.

The present invention also comprises any new starting material disclosed above, especially that mentioned under (a) (b) and (d). The compounds shown under item (a) can be obtained, for example, by treatment of a compound having the formula

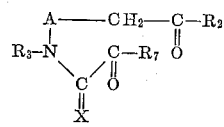

in which $R_7$ stands for etherified hydroxy, especially lower alkoxy, with a basic condensing agent, for example an alkali metal alcoholate, e.g. sodium or potassium methoxide, ethoxide, n-butoxide or tert. butoxide. The above starting material in turn may be obtained from the amine $R_3$—NH—A—$CH_2$—CO—$R_2$ by reaction with an oxalic ester halide or an α-monohalo-alkanoic acid ester.

The compounds shown under item (b) may be obtained by reacting the corresponding lactones or cyclic anhydrides of the formula

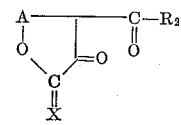

with the hydrazine $R_1$—NH—$NH_2$ analogous to reaction (a) or by dehydrating the corresponding 4-(hydroxy- or carboxy-lower alkyl)-pyrazole-5-carboxylic acids or 4-(carboxy-lower alkyl)-5-hydroxy-methyl-pyrazoles, if necessary via the corresponding acid halides. The latter compounds may also serve as intermediates for the starting material mentioned under item (c), for example, by reactively esterifying the hydroxy-alkyl group and reacting the halide obtained with the amine $R_3$—$NH_2$; if desired any free carboxy group can be esterified previously, the amine-ester obtained saponified and the acid converted into its halide according to known methods. On the other hand, a carboxyl group in said starting material may first be converted into the carbamyl group $R_3NHCO$— and hereupon the free hydroxy group reactively esterified.

The starting material mentioned under item (d) can be obtained from the corresponding ketones by reaction with hydroxyamine; the ketones itself are obtained analogous to process (a) if necessary using compounds with suitably protected, e.g. ketalized, oxo groups.

The starting material shown under item (e) can easily be prepared from the corresponding 4-$R_3$-amino-lower alkyl-pyrazoles by reaction with a lower alkanoyl halide and that mentioned under item (f) by condensation of said amines with a lower alkanal or alkanone.

The compounds of this invention are useful in the form of compositions for enteral, e.g. oral, or parenteral use, which contain a pharmacologically effective amount of the active compound of this invention in admixture with a pharmaceutically acceptable organic or inorganic, solid or liquid carrier. For making up the latter, there are employed the usual carrier materials suitable for the manufacture of pharmaceutical compositions, such as water, gelatine, sugars, e.g. lactose, sucrose or glucose, starches, e.g. corn starch, wheat starch or rice starch, stearic acid or salts thereof, e.g. magnesium or calcium stearate, talc, vegetable oils, ethanol, stearyl alcohol, benzyl alcohol, gums, acacia, tragacanth, polyalkylene glycols, propylene glycol or any other suitable excipient or mixtures thereof. The compositions may be in solid form, e.g. capsules, tablets, dragees or suppositories, or in liquid form, e.g. solutions, suspenisons or emulsions. If desired, they may contain auxiliary substances, such as preserving, stabilizing, wetting, emulsifying, coloring or flavoring agents, salts for varying the osmotic pressure and/or buffers. The above preparations are prepared according to the standard methods used for the manufacture of pharmaceutically acceptable compositions, which, if desired, may also contain, in combination, other physiologically useful substances.

The following examples are intended to illustrate the invention and are not to be construed as being limitations thereon. Temperatures are given in degrees centigrade.

Example 1

A mixture of 7.5 g. of 2,3-dioxo-1-(4-methyl-phenyl)-4-propionyl-piperidine, 6.0 g. of N-(4-fluoro-phenyl)-hydrazine hydrochloride and 0.9 g. of sodium methoxide in 400 ml. of absolute ethanol is refluxed for seventeen hours. The reaction mixture is filtered, the filtrate is evaporated to dryness under reduced pressure, and the oily residue is dissolved in methylene chloride. The organic solution is washed with water, dried over magnesium sulfate and evaporated under reduced pressure to yield 8.1 g. of a crude brow solid material, which is washed with diethyl ether and recrystallized from a mixture of acetone and hexane (decolorization with a charcoal preparation) to yield 5.5 g. of a light tan solid, M.P. 178–185°. This material represents a mixture of 3-ethyl-1-(4-fluoro-phenyl)-6-(4-methyl-phenyl) - 7 - oxo-4,5,6,7-tetrahydro-1H-pyrazolo[3,4-c]pyridine of the formula

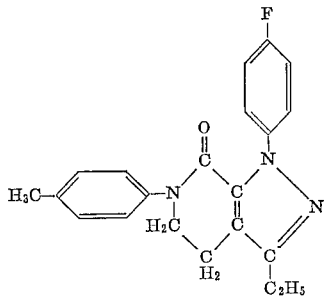

and 3 - ethyl-2-(4-fluoro-phenyl)-6-(4-methyl-phenyl)-7-oxo-4,5,6,7-tetrahydro-2H-pyrazolo[3,4-c]pyridine of the formula

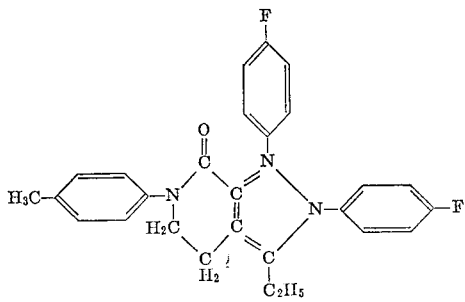

Upon further recrystallizations, an off-white material, melting at 188–190°, is obtained, which again is a mixture of the two compounds, albeit of a different composition. It analyzes as follows:

Calcd. for $C_{21}H_{20}FN_3O$: C, 72.18; H, 6.06; N, 12.03. Found: C, 72.42; H, 5.83; N, 11.84.

Its infrared absorption spectrum (taken in mineral oil) shows no —NH— stretching bands, and a strong broad >C=O adsoprtion centered at 1670 cm$^{-1}$ (not resolved), whereas ultraviolet adsorption spectrum (taken in methanol shows $\lambda_{max}$. at 269 m$\mu$ ($\epsilon$=14,280), and $\lambda_{min}$. at 235 m$\mu$ ($\epsilon$=12,120).

The starting material used in the above procedure is prepared as follows: To 6.6 g. of magnesium turnings is added dropwise while stirring, a solution of 30.0 g. of ethyl bromide in about 100 ml. of anhydrous diethyl ether, which is followed by 30.0 g. of 1-(4-methyl-phenyl)-pyrrolidin-2-one in about 1,100 ml. of anhydrous diethyl ether. The addition of the latter lasts about 45 minutes, and cooling with ice is required occasionally. The reaction mixture is stirred for an additional two hours at room temperature, and is then decomposed with an excess of a dilute aqueous ammonium chloride solution while cooling and stirring. The organic layer is separated, washed with an aqueous solution of sodium chloride, dried over anhydrous magnesium sulfate and concentrated to a small volume. On standing while cooling, the desired 1-[N-(4-methyl-phenyl)-amino]-4-hexanone precipitates (yield: 30.0 g.) and is recrystallized from diethyl ether, M.P. 85–87°.

To a solution of 20.0 g. of 1-[N-(4-methyl-phenyl)-amino]-4-hexanone in 150 ml. of dry benzene is slowly added a suspension of 4.8 g. of sodium hydride (52.6 percent dispersion in mineral oil) in 150 ml. of dry benzene while stirring and maintaining an atmosphere of nitrogen. The reaction mixture is then refluxed for 15 minutes, cooled to room temperature and treated dropwise with 13.3 g. of ethyl oxalyl chloride while cooling with an ice-bath. After stirring for one-half hour, 12 ml. of absolute ethanol is carefully added while cooling, and after an additional thirty minutes, the reaction mixture is washed with water, dried over anhydrous sodium sulfate and evaporated.

The remaining oil, containing the desired 1-[N-ethoxy-oxalyl)-N-(4-methyl-phenyl)-amino]-4-hexanone of the formula

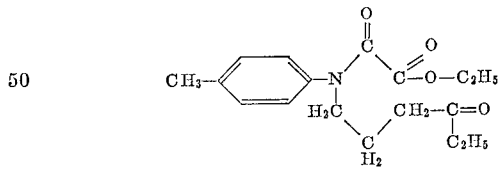

is dissolved in about 125 mil. of absolute ethanol and is treated 5.3 g. of sodium methoxide in 100 ml. of absolute ethanol. The reaction mixture is refluxed for 1½ hours and is then evaporated under reduced pressure. The residue is taken up in water and filtered; the filtrate is acidified with dilute hydrochlorice acid to pH 6, whereupon the 2,3-dioxo-1-(4-methyl-phenyl) - 4 - propionyl - piperidine of the formula

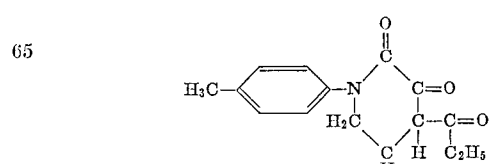

precipitates. A solution of the latter in diethyl ether is decolorized with a charcoal preparation; the desired product melts at 116–118°, after recrystallization from a mixture of diethyl ether and pentane.

Example 2

A solution of 6.0 g. of 2,3 - dioxo - 1-(4-methyl-phenyl) 4-propionyl-piperidine and 3.0 g. of N-phenyl-hydrazine in 100 ml. of absolute ethanol is refluxed for 22 hours, and then filtered. The filtrate is evaporated under reduced pressure to yield an orange-brown oil, which is dissolved in methylene chloride. The organic solution is washed with 50 ml. of a 5 percent aqueous solution of sodium hydroxide, followed by 50 ml. of water, dried over anhydrous magnesium sulfate and evaporated to dryness. The resulting orange oil crystallizes from a mixture of acetone and hexane to yield 2.76 g. of a light tan solid, which is substantially uniform and is either 3-ethyl-6-(4-methyl-phenyl) - 1 - phenyl - 7 - oxo-4,5,6,7 - tetrahydro-1H-pyrazolo[3,4-c]pyridine of the formula

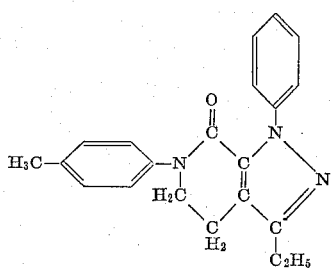

or the 3 - ethyl - 6 - (4 - methyl-phenyl) - 2 - phenyl-7-oxo - 4,5,6,7 - tetrahydro - 2H - pyrazolo[3,4-c]pyridine of the formula

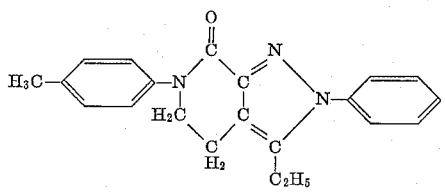

The product melts at 110–112° after several recrystallizations from a mixture of acetone and hexane. It analyzes as follows:

Calcd. for $C_{21}H_{21}N_3O$: C, 76.10; H, 6.39; N, 12.68. Found: C, 76.19; H, 6.59; N, 12.83.

Its infrared absorption spectrum (taken in mineral oil) shows no —NH— stretching bands, and a strong, broad >C=O absorption centered 1665 cm.$^{-1}$ (not resolved), whereas its ultraviolet absorption spectrum (taken in methanol) shows $\lambda_{max}$ (shoulder) at 216 m$\mu$ ($\epsilon$=17,210) and at 270 m$\mu$ ($\epsilon$=13,450), and $\lambda_{min}$ at 237 m$\mu$ ($\epsilon$=8,720).

Example 3

To 6.0 g. of 2,3 - dioxo - 1 - (4 - methyl-phenyl)-4-propionyl-piperidine in 100 ml. of ethanol is added 0.85 g. of anhydrous hydrazine (95%), and the reaction mixture is refluxed for 17 hours. The ethanol is then evaporated and the residue is crystallized from a mixture of acetone and hexane to yield 4.4 g. of the crude product which is either the 3 - ethyl - 6 - (4 - methyl-phenyl)-7-oxo-4,5,6,7-tetrahydro-1H-pyrazolo[3,4-c]pyridine of the formula

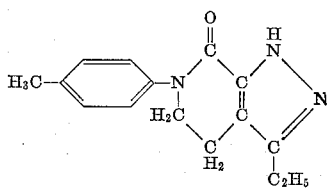

of the 3 - ethyl - 6 - (4 - methyl-phenyl) - 7 - oxo-4,5,6,7-tetrahydro-2H-pyrazolo[3,4-c]pyridine of the formula

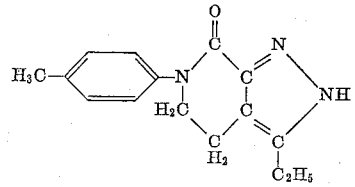

After repeated recrystallizations from a mixture of acetone and hexane, the white product melts at 177–179°, and analyzes as follows:

Calcd. for $C_{15}H_{17}N_3O$: C, 70.56; H, 6.71; N, 16.46. Found: C, 70.30; H, 6.75; N, 16.22.

Its infrared absorption spectrum (taken in mineral oil) shows a broad, strong —NH— band centered at 3182 cm.$^{-1}$ and a broad, strong >C=O absorption at 1659 cm.$^{-1}$, whereas its ultraviolet absorption spectrum (taken in methanol) shows $\lambda_{max}$ at 245–249 m$\mu$ ($\epsilon$=9,840), and $\lambda_{min}$ at 236 m$\mu$ ($\epsilon$=9,170).

Example 4

To a solution of 6.0 g. of 2,3 - dioxo - 1 - (4-methyl-phenyl) - 4 - propionyl-piperidine in 150 ml. of ethanol is added 1.22 g. of the solvent is evaporated and the residue is crystallized from a mixture of diethyl ether and pentane to yield 2.0 g. of a compound which is either the 3 - ethyl - 1 - methyl - 6 - (4-methyl-phenyl) 7 - oxo - 4,5,6,7 - tetrahydro - 1H - pyrazolo[3,4-c] pyridine of the formula

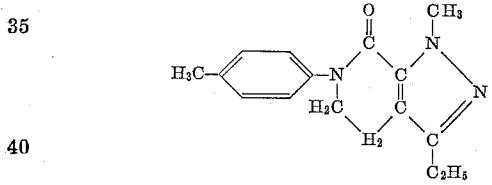

or the 3 - ethyl - 2 - methyl - 6 - (4-methyl-phenyl)-7-oxo - 4,5,6,7 - tetrahydro - 2H - pyrazolo[3,4-c]pyridine of the formula

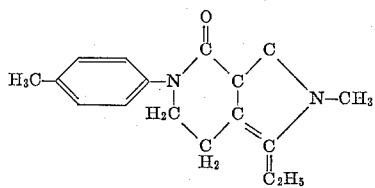

or a mixture of the two compounds. After recrystallization from a mixture of acetone and hexane, the product melts at 188–190° and analyzes as follows:

Calcd. for $C_{16}H_{19}N_3O$: C, 71.34; H, 7.11; N, 15.60. Found: C, 71.72; H, 7.13; N, 15.52.

Its infrared absorption spectrum (taken in mineral oil) shows no —NH— stretching band and a strong, broad >C=O absorption centered at 1672 cm.$^{-1}$, whereas its ultraviolet absorption spectrum (taken in methanol) shows $\lambda_{max}$ at 252–254 m$\mu$ ($\epsilon$=10,640), and $\lambda_{min}$ at 225 m$\mu$ ($\epsilon$=9,660).

Example 5

A solution of 4.0 g. of 4-benzoyl-2,3-dioxo-1-(4-methyl-phenyl)-piperidine in 75 ml. of ethanol is treated with 0.42 g. of anhydrous hydrazine (95 percent), and the reaction mixture is refluxed for 22 hours. The solvent is evaporated to yield 3.4 g. of the crude product, which is either the 6-(4-methyl-phenyl)-3-phenyl-7-oxo-1,2,3,4-tetrahydro-1H-pyrazolo[3,4-c]pyridine of the formula

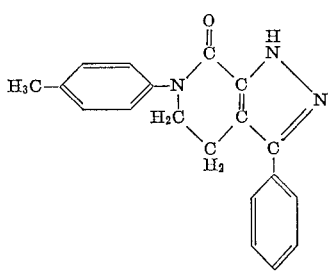

or the 6-(4-methyl-phenyl)-3-phenyl-7-oxo-1,2,3,4-tetra-hydro-2H-pyrazolo[3,4-c]pyridine of the formula

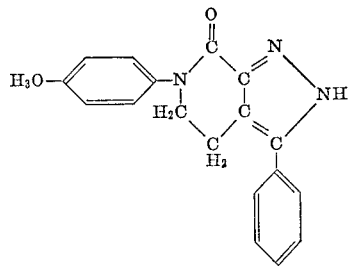

After two recrystallizations from methanol, it melts at 280–282°, and analyzes as follows:

Calcd. for $C_{19}H_{17}N_3O$: C, 75.22; H, 5.65; N, 13.85. Found: C, 75.05; H, 5.91; N, 13.69.

Its infrared absorption spectrum (taken in mineral oil) shows a strong, broad —NH— stretching band centered at 3174 cm.$^{-1}$, and a strong, broad >C=O band at 1659 cm.$^{-1}$, and its ultraviolet absorption spectrum (taken in methanol) shows $\lambda_{max.}$ at 232 m$\mu$ (shoulders; $\epsilon$=21,330) and at 248 m$\mu$ ($\epsilon$=22,290), and $\lambda_{min.}$ at 22 m$\mu$ ($\epsilon$=19,820).

The starting material used in the above procedure is prepared as follows: To a Gignard reagent, prepared from 55.0 g. of bromobenzene and 8.4 g. of magnesium in 750 ml. of anhydrous diethyl ether, is added dropwise 30.0 g. of 1-(4-methyl-phenyl)-pyrrolidin-2-one in 250 ml. of diethyl ether. After stirring for 24 hours, the reaction mixture is treated with 400 ml. of a diluted aqueous solution of ammonium chloride, which is added dropwise and while stirring. The organic layer is separated, washed with dilute aqueous ammonium chloride and water, dried over magnesium sulfate and evaporated to dryness to yield the crude $\gamma$-[N-(4-methyl-phenyl)-amino]-butyrophenone, which melts at 105–107° after recrystallization from diethyl ether.

To a solution of 10.0 g. of $\gamma$-[N-(4-methyl-phenyl)-amino]-butyrophenone in about 100 ml. of dry benzene is added 1.95 g. of a 52.8 percent dispersion of sodium hydride in mineral oil, suspended in 100 ml. of dry benzene, while stirring and maintaining an atmosphere of nitrogen. The reaction mixture is refluxed for 15 minutes, cooled and treated with 5.5 g. of ethyl oxalyl chloride while stirring and cooling in an ice-bath. After agitating for thirty minutes, several ml. of absolute ethanol are added while cooling, and after 15 minutes, the reaction mixture is treated with an excess of water. The organic layer is separated, dried over magnesium sulfate and evaporated to yield the $\gamma$-[N-(ethoxy-oxalyl)-N-(4-methyl)-amino]-butyrophenone of the formula

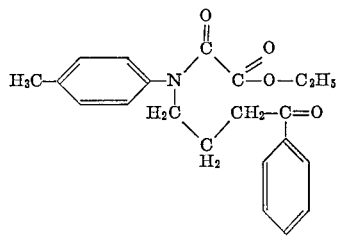

which is obtained as a heavy red oil.

The above product is dissolved in 150 ml. of absolute ethanol, treated with 2.2 g. of sodium methoxide and refluxed for 1½ hours. The ethanol is evaporated, and the residue is treated with water and filtered. The filtrate is acidified with dilute hydrochloric acid to pH 6; the resulting yellow, cloudy solution is extracted with methylene chloride, and the organic extract is dried over magnesium sulfate and evaporated. The resulting 4-benzoyl-2,3-dioxo-1-(4-methyl-phenyl)-piperidine of the formula

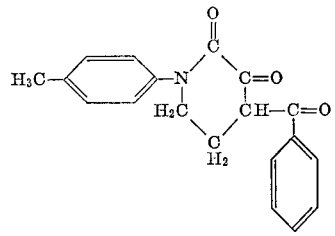

is recrystallized from a mixture of diethyl ether and pentane (including a treatment with a charcoal preparation); yield: 7.5 g.; it melts at 129–131°.

*Example 6*

To 6.0 g. of 4-benzoyl-2,3-dioxo-1-(4-methyl-phenyl)-piperidine in 100 ml. of ethanol is added a suspension of 3.24 g. of N-(4-fluoro-phenyl)-hydrazine hydrochloride in 50 ml. of ethanol, followed by a solution of 1.08 g. of sodium methoxide in 50 ml. of ethanol. The reaction mixture is refluxed for 24 hours and then evaporated to dryness. The crude material is washed twice with a 2 percent aqueous solution of sodium hydroxide, and then allowed to stand for several minutes in 250 ml. of diethyl ether to yield 4.7 g. of a pink solid material. The latter is recrystallized from ethanol (with charcoal decolorization) and from ethyl acetate to yield the pure product, which is either the 1-(4-fluoro-phenyl)-6-(4-methyl-phenyl)-3-phenyl - 7 - oxo - 4,5,6,7 - tetrahydro - 1H - pyrazolo [3,4-c]pyridine of the formula

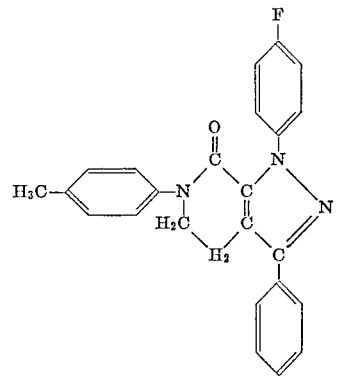

or the 2-(4-fluoro-phenyl)-6-(4-methyl-phenyl)-3-phenyl-7 - oxo-4,5,6,7-tetrahydro-2H-pyrazolo[3,4-c]pyridine of the formula

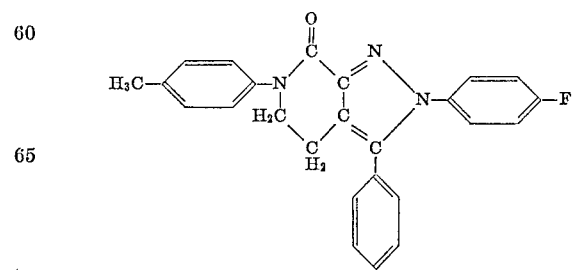

It melts at 228–229°, and analyzes as follows:
Calcd. for $C_{25}H_{20}FN_3O$: C, 75.54; H, 5.08; N, 10.58. Found: C, 75.24; H, 5.05; N, 10.65.

Its infrared absorption spectrum (taken in mineral oil) shows a sharp, strong >C=O band at 1692 cm.$^{-1}$, and its ultraviolet absorption spectrum (taken in methanol) shows λ_max. at 234 mμ (shoulder; ε=22,710) and at 273 mμ (ε=18,770), and λ_min. at 254 mμ (ε=17,130).

*Example 7*

Other compounds, which are prepared according to the abovedescribed and illustrated procedure by selecting the appropriate starting materials, are, for example, 1 - cyclohexyl - 3-methyl-6-phenyl-7-oxo-4,5,6,7-tetrahydro-1H-pyrazolo[3,4-c]pyridine and/or 2-cyclohexyl-3-methyl - 6 - phenyl-7-oxo-4,5,6,7-tetrahydro-2H-pyrazolo-[3,4-c]pyridine, prepared by reacting 4-acetyl-2,3-dioxo-1-phenyl-piperidine with N-cyclohexylhydrazine;

1 - cyclopentylmethyl-6-(4-chloro-phenyl)-3-isopropyl-7 - oxo - 4,5,6,7-tetrahydro-1H-pyrazolo[3,4-c]pyridine and/or 2 - cyclopentylmethyl - 6-(4-chloro-phenyl)-3-isopropyl - 7-oxo-4,5,6,7-tetrahydro-2H-pyrazolo[3,4-c]pyridine, prepared by reacting 2,3-dioxo-1-(4-chlorophenyl)-4-isobutyryl-1-piperidine with N-cyclopentylmethyl-hydrazine;

1 - benzyl - 6 - methyl-3-(4-methyl-phenyl)-7-oxo-4,5,6,7-tetrahydro-1H-pyrazolo[3,4-c]pyridine and/or 2-benzyl - 6-methyl-3-(4-methylphenyl)-7-oxo-4,5,6,7-tetrahydro-2H-pyrazolo[3,4-c]pyridine, prepared by reacting 2,3-dioxo-1-methyl-4-(-methyl-4-benzoyl)-piperidine with N-benzyl-hydrazine;

6 - (3,4 - dichloro-phenyl) - 3 - ethyl-1-(4-methoxyphenyl) - 7-oxo-4,5,6,7-tetrahydro-1H-pyrazolo[3,4-c]pyridine and/or 6 - (3,4 - dichlorophenyl) - 3-ethyl-2-(4-methoxy-phenyl) - 7-oxo-4,5,6,7-tetrahydro-2H-pyrazolo-[3,4-c]pyridine, prepared by reacting 1 - (3,4 - dichlorophenyl) - 2,3 - dioxo-4-propionyl-piperidine with N-(4-methoxyphenyl)-hydrazine;

3 - ethyl - 6-(4-methoxy-phenyl)-7-oxo-1-(4-trifluoromethyl-phenyl) - 4,5,6,7 - tetrahydro-1H-pyrazolo[3,4-c] pyridine and/or 3-ethyl-6-(4-methoxy-phenyl)-7-oxo-2(4-trifluoromethyl-phenyl) - 4,5,6,7-tetrahydro-2H-pyrazolo-[3,4 - c]pyridine, prepared by reacting 2,3 - dioxo-1-(4-methoxy-phenyl) - 4-propionyl-piperidine with N-(4-trifluoromethyl-phenyl)-hydrazine;

3 - benzyl - 6-(4-bromo-phenyl)-1-(2-pyridyl)-7-oxo-4,5,6,7-tetrahydro-1H-pyrazolo[3,4-c]pyridine and/or 3-benzyl - 6-(4-bromophenyl)-2-(2-pyridyl)-7-oxo-4,5,6,7-tetrahydro-2H-pyrazolo[3,4-c] pyridine, prepared by reacting 1 - (4 - bromo-phenyl)-2,3-dioxo-4-phenylacetyl-piperidine with N-(2-pyridyl)-hydrazine;

3 - ethyl - 5 - methyl-1-(4-methyl-phenyl)-6-phenyl-7-oxo - 4,5,6,7 - tetrahydro - 1H-pyrazolo[3,4-c]pyridine and/or 3-ethyl-5-methyl-2-(4-methyl-phenyl)-6-phenyl-7-oxo - 4,5,6,7-tetrahydro-2H-pyrazolo[3,4-c]pyridine, prepared by reacting 2,3 - dioxo - 6-methyl-1-phenyl-4-propionyl-piperidine with N-(4-methyl-phenyl)-hydrazine;

3 - ethyl - 6 - (4 - methyl-phenyl)-1-(4-N,N-dimethylamino-phenyl)-7-oxo-4,5,6,7-tetrahydro-1H-pyrazolo[3,4-c]pyridine and/or 3-ethyl-6-(4-methyl-phenyl)-2-(4,N,N-dimethylamino- phenyl) - 7 - oxo - 4,5,6,7 - tetrahydro-2H-pyrazolo[3,4-c]pyridine, prepared by reacting 2,3-dioxo - 1-(4-methyl-phenyl)-4-propionyl-piperidine with N-(N,N-dimethylamino-phenyl)-hydrazine;

3 - cyclohexyl - 6 - (2 - N,N-diethylaminoethyl)-1-(2-methoxyethyl) - 7 - oxo-4,5,6,7-tetrahydro-1H-pyrazolo-[3,4 - c]pyridine and/or 3-cyclohexyl-6-(2-N,N-diethylaminoethyl) - 2-(2-methoxyethyl)-7-oxo-4,5,6,7-tetrahydro-2H-pyrazolo[3,4-c]pyridine, prepared by reacting 1-(2 - N,N-diethylaminoethyl)-2,3-dioxo-4-hexahydrobenzoyl-piperidine with N-(2-methoxyethyl)-hydrazine;

1 - allyl - 3-ethyl-6-(4-methylmercapto-phenyl)-7-oxo-4,5,6,7 - tetrahydro-1H-pyrazolo[3,4-c]pyridine and/or 2-allyl-3-ethyl-6-(4-methylmercapto-phenyl)-7-oxo-4,5,6,7-tetrahydro-2H-pyrazolo[3,4-c]pyridine, prepared by reacting 2,3 - dioxo-1-(4-methylmercaptophenyl)-4-propionyl-piperidine with N-allyl-hydrazine, and the like.

The above compounds, such as the 3-ethyl-1-(4-fluorophenyl) - 6 - (4-methyl-phenyl)-7-oxo-4,5,6,7-tetrahydro-1H-pyrazolo[3,4-c]pyridine and the like, when treated with a suitable acid, e.g. hydrochloric acid, picric acid and the like, are converted into their acid addition salts, such as the 3-ethyl-1-(4-fluoro-phenyl)-6-(4-methyl-phenyl)-7-oxo-4,5,6,7-tetrahydro-1H-pyrazolo[3,4-c]pyridine hydrochloride, 3 - ethyl - 1 - (4 - fluorophenyl)-6-(4-methylphenyl) - 7 - oxo - 4,5,6,7-tetrahydro-1H-pyrazolo[3,4-c] pyridine picrate and the like.

*Example 8*

The solution of 8.0 g. of 1-phenyl-2,3-dioxo-4-propionyl-piperidine in 120 ml. of ethanol is combined with the suspension of 5.9 g. of 4-fluoro-phenyl-hydrazine hydrochloride in 80 ml. of ethanol and to the whole 0.892 g. of sodium methoxide in 60 ml. of ethanol is added. This mixture is then refluxed for 24 hours in a dry atmosphere; it remained cloudy throughout the reflux period. After this time, it is filtered hot, leaving a small amount of a white, water-soluble solid on the filter. The clear filtrate is evaporated under vacuum, giving an orange-brown oil which is dissolved in approximately 50 ml. of methylene chloride. The solution is washed twice with 5% aqueous sodium hydroxide, the methylene chloride layer is dried and evaporated, leaving an orange oil. Excess diethyl ether is added to this oil to give an orange solution and causing the insoluble remaining oil to crystallize on scratching. The solid is filtered and crystallized twice from acetone to give white crystals of 2-(4-fluoro-phenyl)-3-ethyl-6-phenyl-7-oxo-4,5,6,7 - tetrahydro-2H-pyrazolo[3,4-c]pyridine of the formula

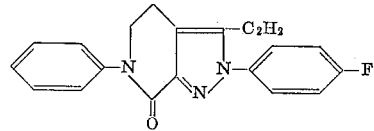

melting at 208–210°.

The 1-(4-fluoro-phenyl)-3-ethyl-6-phenyl-7-oxo-4,5,6,7-tetrahydro - 1H - pyrazolo[3,4-c]pyridine is obtained by evaporating the ether wash solution to give a somewhat oily solid. This is dissolved in cyclohexane, the solution decolorized and concentrated. A white powder is formed on cooling and recrystallized once more from ether to yield slightly yellowish gemlike crystals M.P. 106.5–108°.

The starting material can be obtained as follows:

To the mixture of 23 g. of 1-phenylamino-4-hexanone, 300 ml. of benzene and 240 ml. of 1 N-aqueous sodium hydroxide, the solution of 24.5 g. of ethyl oxalyl chloride in 50 ml. of benzene is added dropwise with stirring. The reaction mixture becomes warm and stirring is continued for 2 hours. Thereupon the benzene layer is separated, dried and evaporated to give a red-brown oil, representing the 1-(N-ethoxy-oxalyl-N-phenyl)-amino-4-hexanone.

This is dissolved in 125 ml. of anhydrous ethanol and combined with the solution of 6.5 g. sodium methoxide in 60 ml. of ethanol. The mixture is refluxed in a dry atmosphere for 2½ hours and evaporated under reduced pressure. The residue is dissolved in water, the solution filtered and the filtrate acidified with dilute hydrochloric acid to a pH of about 5. The cream colored precipitate formed is filtered off, dissolved in methylene chloride, the solution dried and evaporated. On addition of hexane to the residue and while cooling the 1 - phenyl-2,3-dioxo-4-propionyl-piperidine crystallizes in fluffy white needles melting at 144–146°.

*Example 9*

To a suspension of 0.69 g. of lithium aluminum hydride in 60 ml. of anhydrous diethyl ether 1.0 g. of 1-(4-fluorophenyl) - 3-ethyl-6-phenyl-7-oxo-4,5,6,7-tetrahydro-1H-pyrazolo[3,4-c]pyridine is added portionwise while stirring. On completion of addition, the mixture is stirred at room temperature for 10 minutes. Then the ether is distilled off while 75 ml. of dry toluene is added. When the temperature reaches 107°, the mixture is refluxed for 3 hours and then allowed to stand and cool overnight. To the mixture, ice chips are cautiously added with stirring; the toluene is filtered, the solid extracted twice with methylene chloride, and the combined methylene chloride-toluene layer is dried and evaporated, leaving a yellow oil. This is dissolved in pentane, the solution concentrated and on chilling white needles separate representing the 1-(4-fluorophenyl) - 3 - ethyl - 6 - phenyl - 4,5,6,7 - tetrahydro - 1H-pyrazolo-[3,4-c]pyridine of the formula

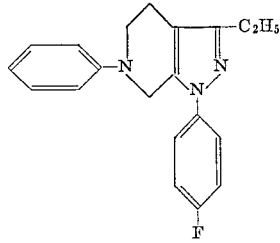

melting at 93–95°.

*Example 10*

In the manner described in Example 8, 6.0 g. of 1-phenyl - 2,3 - dioxo-4-propionyl-piperidine in 125 ml. of ethanol and 4.44 g. of 4-chloro-phenyl-hydrazine hydrochloride in 50 ml. of ethanol are reacted with 0.672 g. of sodium methoxide in 20 ml. of ethanol to yield the ether-insoluble 2 - (4 - chloro-phenyl)-3-ethyl-6-phenyl-7-oxo-4,5,6,7-tetrahydro-2H-pyrazolo[3,4-c]pyridine of the formula

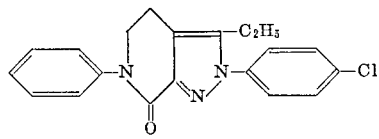

melting at 166–167° after recrystallization from acetone.

From the evaporated ether solutions, the 1-(4-chlorophenyl) - 3 - ethyl-6-phenyl-7-oxo-4,5,6,7-tetrahydro-1H-pyrazolo-[3,4-c]pyridine is obtained which is recrystallized from diethyl ether, transformed into its hydrobromide, the salt filtered off, reconverted into the free base and the latter is again recrystallized from diethyl ether, M.P. 121–122°.

*Example 11*

4.0 g. of 1-phenyl-2,3-dioxo-4-propionyl-piperidine in 100 ml. of ethanol, 2.6 g. of p-tolylhydrazine hydrochloride in 60 ml. of ethanol and 0.448 g. of sodium methoxide in 15 ml. of ethanol are reacted as described in Example 8 in order to obtain from the ethereal solution first the 2-(4-methyl-phenyl)-3-ethyl-6-phenyl-7-oxo-4,5,6,7-tetrahydro-2H-pyrazolo[3,4-c]-pyridine of the formula

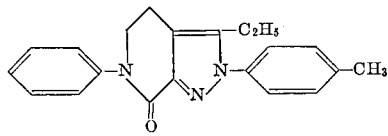

which melts, after recrystallization from acetone, at 164–166°.

The 1-(4-methyl-phenyl)-3-ethyl-6-phenyl-7-oxo-4,5,6,7-tetrahydro-1H-pyrazolo[3,4-c]pyridine, obtained from the ether-solutions, is recrystallized from diethyl ether, then from cyclohexane and again from diethyl ether and melts at 128–130°.

*Example 12*

To the solution of 10.0 g. of 1-(4-methyl-phenyl)-2,3-dioxo-4-propionyl-piperidine in 300 ml. of anhydrous ethanol, the suspension of 8.0 g. of 4-fluoro-phenyl-hydrazine hydrochloride in 100 ml. of ethanol is added, the whole is combined with 1.2 g. sodium methoxide in 100 ml. of ethanol and refluxed for 17 hours. A small amount of tan solid is filtered off, and the filtrate is concentrated under vacuum to give a dark sticky residue. It is dissolved in 300 ml. of methylene chloride, washed once with water, and twice with 150 ml. portions of 2% aqueous sodium hydroxide. The solution is dried over anhydrous magnesium sulfate and concentrated to give a sticky solid. 200 ml. of diethyl ether are added, the whole is allowed to stand for 1 hour and the ether insoluble solid is filtered off and left standing with fresh ether twice more. Then the solid is extracted with boiling ether twice and filtered to give a tan solid melting at 175–185°. It is recrystallized from acetone-norite once and again from acetone to give white crystals having the double melting point at 188–190° and 199–201°; it represents the 2-(4-fluoro - phenyl) - 3 - ethyl-6-(4-methyl-phenyl)-7-oxo-4,5,6,7-tetrahydro-2H-pyrazolo[3,4-c]pyridine.

All the ether washes from the above procedure are combined and concentrated to give a sticky solid. It is extracted with boiling cyclohexane, the solution decolorized and concentrated. Overnight, yellow crystals precipitate, melting at 130–140°. They are dissolved in diethyl ether, the solution is decolorized again and hydrogen bromide is bubbled through, until no more precipitate is formed. A tan salt is filtered off, dissolved in methylene chloride and the solution washed twice with 5% aqueous sodium hydroxide. The organic layer is dried and concentrated and the solid recrystallized twice from diethyl ether to give white needles representing the 1-(4-fluorophenyl)-3-ethyl-6-(4-methyl - phenyl)7-oxo-4,5,6,7,tetrahydro-1H-pyrazolo[3,4-c]pyridine melting at 145–147°. Both products are identical with those described in Example 1.

*Example 13*

1.05 g. of 1-(4-fluoro-phenyl)-3-ethyl-6-(4-methylphenyl) - 7 - oxo-4,5,6,7-tetrahydro-1H-pyrazolo[3,4-c]-pyridine are reduced with 0.68 g. of lithium aluminum hydride in 50 ml. of diethyl ether as shown in Example 9. The so obtained 1-(4-fluoro-phenyl)-3-ethyl-6-(4-methylphenyl)-4,5,6,7-tetrahydro-1H-pyrazolo[3,4-c]pyridine of the formula

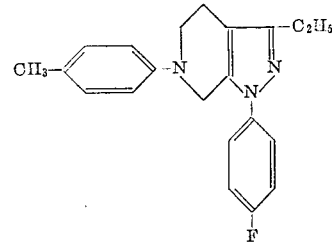

is recrystallized from pentane and melts at 90–93°.

*Example 14*

To the solution of 8.0 g. of 1-(4-methyl-phenyl)-2,3-dioxo-4-propionyl-piperidine in 200 ml. of ethanol 3.3 g. of phenylhydrazine are added with stirring and the mixture is refluxed for 24 hours. Thereupon it is filtered, the filtrate evaporated under reduced pressure, the residue dissolved in methylene chloride, the solution washed with water and 2% aqueous sodium hydroxide, dried and concentrated. The residue is extracted with diethyl ether and the remaining residue is recrystallized from acetone to yield the 2-phenyl-3-ethyl-6-(4-methyl-phenyl)-7-oxo-4,5,6,7-tetrahydro-2H-pyrazolo[3,4-c]-pyridine melting at 193–195°.

The 1-phenyl-3-ethyl-6-(4-methyl-phenyl)-7-oxo-4,5,6,7-tetrahydro-1H-pyrazolo[3,4-c]pyridine obtained from the ether solutions is recrystallized from ether-pentane, cyclohexane and again from ether-pentane and melts at 123.5–125.5°. These compounds are somewhat purer than the products obtained according to Example 2.

*Example 15*

To the solution of 3.1 g. of 1-(4-methyl-phenyl)-2,3-dioxo-4-acetyl-piperidine in 100 ml. of ethanol, the suspension of 2.46 g. of 4-fluoro-phenylhydrazine hydrochloride in 50 ml. of ethanol and the solution of 0.38 g. of sodium methoxide in 10 ml. of ethanol are added. The mixture is refluxed for 19 hours, concentrated under reduced pressure and the residue dissolved in methylene chloride. The solution is washed once with water, twice with 2% aqueous sodium hydroxide, dried and concentrated. The residue is extracted several times with boiling diethyl ether and the insoluble part recrystallized from acetone-norite to yield the 2-(4-fluoro-phenyl)-3-methyl-6-(4-methyl - phenyl)-7-oxo-4,5,6,7-tetrahydro-2H-pyrazolo[3,4-c]-pyridine of the formula

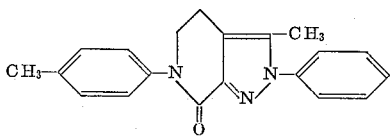

melting at 239–240.5°.

The combined ether extracts are decolorized with norite, evaporated and the residue extracted with boiling cyclohexane. The extract is concentrated and on cooling the 1-(4-fluoro-phenyl)-3-methyl-6-(4-methyl-phenyl)-7-oxo-4,5,6,7-tetrahydro-1H-pyrazolo[3,4-c]pyridine precipitates; it melts after recrystallization from diethyl ether at 164–165°.

The starting material may be prepared as follows:

The mixture of 42.6 g. methyl iodide, 150 ml. of anhydrous diethyl ether and 7.3 g. of magnesium turnings is stirred at room temperature until all of the magnesium is used up. To this Grignard reagent, the solution of 26.25 g. of 1-(4-methyl-phenyl)-2-pyrrolidone in 1000 ml. of ether is added over a 20-minute period and the mixture is stirred at room temperature over the weekend. 500 ml. of 10% aqueous ammonium chloride solution is added slowly with cooling and when decomposition is complete, the ether layer is separated, washed once with water, dried and concentrated. On cooling white crystals melting at 63–75° separate out and the concentrated mother liquors give a second crop of crystals melting at 56–75°. The combined solids are purified from 2% acetic acid solution and precipitated with 10% aqueous sodium hydroxide. On recrystallization from diethyl ether, the 1-(4-methyl-phenylamino) - 4 - pentanone, melting at 86–88°, is obtained.

11.5 g. thereof are dissolved in 25 ml. of benzene, the suspension of 2.72 g. of sodium hydride in 50 ml. of benzene is added with stirring and the whole is refluxed for 15 minutes. After cooling in an ice bath, the solution of 8.2 g. of ethyl oxalyl chloride in 20 ml. of benzene is added while cooling and stirring over a 40-minute period and stirring is continued for 30 minutes at room temperature. Thereupon 7.5 ml. of ethanol are added dropwise with cooling, followed by 50 ml. of water. The two layers formed are separated, and the aqueous layer is extracted twice with benzene. The combined extracts are dried and concentrated under vacuum to yield a red oil. This is dissolved in 100 ml. of ethanol and to it the solution of 3.24 g. of sodium methoxide in 50 ml. ethanol is added. The whole is refluxed for 2 hours and concentrated under vacuum. To the residue water is added, the mixture is filtered, and the filtrate acidified to pH 5 with dilute hydrochloric acid. The orange solid is filtered off, dried and recrystallized from cyclohexane to give the 1-(4-methyl-phenyl)-2,3-dioxo-4 - acetyl-piperidine melting at 132–134°.

Example 16

1.0 g. of 1-(4-fluoro-phenyl)-3-methyl-6-(4 - methyl-phenyl)-7-oxo-4,5,6,7 - tetrahydro - 1H - pyrazolo[3,4-c]pyridine is reduced with 0.68 g. of lithium aluminum hydride in 50 ml. of diethyl ether as described in Example 9. The remaining oil cannot be crystallized. It is taken up in ether and isopropanolic hydrobromic acid is added. The precipitated 1-(4-fluoro-phenyl)-3 - methyl-6-(4-methyl-phenyl)-4,5,6,7-tetrahydro-1H-pyrazolo - [3,4-c]pyridine hydrobromide of the formula

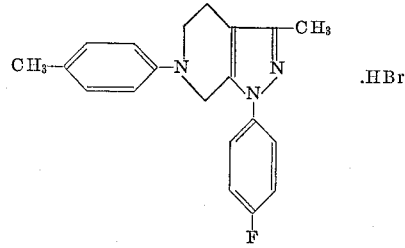

is filtered off and recrystallized from methanol-ether and then from isopropanol, M.P. 230–232°.

Example 17

10.0 g. of 1-(4-methyl-phenyl)-2,3-dioxo-4-n-butyryl-piperidine in 175 ml. of ethanol are reacted with 6 g. of 4-fluoro - phenylhydrazine hydrochloride in 100 ml. of ethanol after addition of 1.0 g. of sodium methoxide in 50 ml. of ethanol. The reaction mixture is worked up as described in Example 12 to yield the 2-(4-fluoro-phenyl)-3-n-propyl-6-(4-methyl-phenyl)-7 - oxo - 4,5,6,7 - tetrahydro-2H-pyrazolo[3,4-c]pyridine of the formula

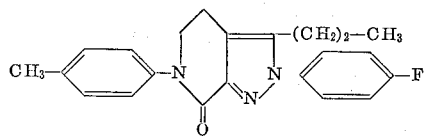

melting at 196–198° after recrystallization from acetone, and as the ether-soluble part the 1-(4-fluoro-phenyl)-3-n-propyl-6-(4-methyl-phenyl)-7-oxo - 4,5,6,7 - tetrahydro-1H-pyrazolo[3,4-c]pyridine melting at 105–106.5° after recrystallization from diethyl ether.

The latter compound is reduced as shown in Example 9 to yield the 1-(4-fluoro-phenyl)-3-n-propyl-6-(4-methyl-phenyl)-4,5,6,7-tetrahydro-1H-pyrazolo - [3,4-c]pyridine melting at 121–123° after recrystallization from pentane.

Example 18

The mixtures of 3.0 g. of 1-(4-methoxy-phenyl)-2,3-dioxo-4-propionyl-piperidine in 45 ml. of ethanol, 1.95 g. of 4-fluoro-phenylhydrazine hydrochloride in 30 ml. of ethanol and 0.324 g. of sodium methoxide in 30 ml. of ethanol are combined in this order and the reaction mixture worked up as shown in Example 8. There is obtained as the ether-insoluble part the 2-(4-fluoro-phenyl)-3-ethyl-6-(4-methoxy-phenyl)-7-oxo-4,5,6,7 - tetrahydro-2H-pyrazolo[3,4-c]pyridine of the formula

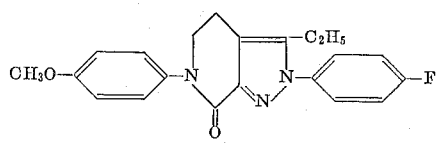

melting at 184–186° (acetone) and the 1-(4-fluoro-phenyl)-3-ethyl-6-(4-methoxy-phenyl)-7-oxo - 4,5,6,7 - tetrahydro-1H-pyrazolo-[3,4-c]pyridine melting at 133–134° (diethyl ether).

0.5 g. of the latter are reduced with 0.31 g. of lithium aluminum hydride in 30 ml. of diethyl ether to yield the 1-(4-fluoro-phenyl)-3-ethyl - 6 - (4-methoxy - phenyl)-4,5,6,7-tetrahydro-1H-pyrazolo[3,4-c]pyridine melting at 97–99° (pentane).

Example 19

6.0 g. of 1-(4-methyl-phenyl)-2,3-dioxo - 4 - benzoyl-piperidine in 100 ml. of ethanol, 3.24 g. of 4-fluoro-phenylhydrazine hydrochloride in 75 ml. of ethanol and 1.08 g. of sodium methoxide in 25 ml. of ethanol are reacted and the reaction mixture worked up as shown in Example 12 to yield the 2-(4-fluorophenyl)-3-phenyl-6-(4-methylphenyl) - 7 - oxo-4,5,6,7-tetrahydro-2H-pyrazolo[3,4-c]-pyridine of the formula

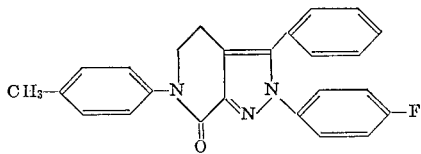

melting at 227–229° (acetone) and from the ether washing the 1-(4-fluoro-phenyl)-3-phenyl-6-(4-methyl-phenyl)-7-oxo - 4,5,6,7 - tetrahydro-1H-pyrazolo[3,4-c]pyridine. The products are identical with those described in Example 6.

The starting material is obtained by reaction of 40 g. of 1-(4-methyl-phenyl)-2-pyrrolidone in 900 ml. of ether with phenyl magnesium bromide (obtained from 71.8 g. of bromo-benzene and 11.0 g. of magnesium in 300 ml. of ether) via the 3-(4-methylphenylamino)-propiophenone, M.P. 105–107°, reaction of 15.0 g. of the latter in 200 ml. of benzene with 2.95 g. of sodium hydride in 50 ml. of benzene and 8.3 g. of ethyl oxalyl chloride and condensation of the reaction product in 100 ml. of ethanol with 3.3 g. of sodium methoxide in 100 ml of ethanol. The so-obtained 1 - (4-methyl-phenyl)-2,3-dioxo-4-benzoyl-piperidine melts at 129–131° (diethyl ether).

*Example 20*

The solution of 3.2 g. of 1-phenyl-2,3-dioxo-4-propionyl-6-methyl-piperidine in 25 ml. of ethanol is combined with the suspension if 2.15 g. of 4-fluoro-phenyl-hydrazine hydrochloride in 25 ml. of ethanol and the solution of 0.35 g. of sodium methoxide in 10 ml. of ethanol. The reaction mixture is worked up as shown in Example 12 and there is obtained as the ether-insoluble part the 2-(4-fluoro-phenyl)-3-ethyl-5-methyl-6-phenyl-7-oxo-4,5,6,7-tetrahydro-2H-pyrazolo[3,4-c]pyridine of the formula

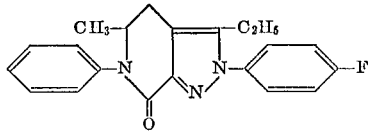

melting at 203–206° (acetone) and the 1-(4-fluoro-phenyl)-3-ethyl-5-methyl-6-phenyl-7-oxo-4,5,6,7 - tetrahydro-1H-pyrazolo[3,4-c]pyridine melting at 117–119° (hexane).

The starting material can be obtained as follows:

The mixture of 50 g. of γ-valerolactone, 50 g. if aniline and 20 g. of aniline hydrochloride is heated slowly to 210° and held at this temperature for one hour. It is then allowed to cool, washed with water, then with three portions of 100 ml. of 2% aqueous acetic acid, diluted with methylene chloride, dried and evaporated under vacuum. The residue is recrystallized and decolorized from ether to give the 1-phenyl-2-methyl-5-pyrrolidone melting at 55–57°.

20 g. thereof in 250 ml. of diethyl ether are reacted with ethyl magnesium bromide (obtained from 24.8 g. of ethyl bromide and 5.48 g. of magnesium in 100 ml. of ether) to yield the 2-phenylamino-5-n-heptanone. 18.0 g. therefrom are dissolved in 150 ml. benzene and reacted with 12.9 g of ethyl oxalyl chloride in the presence of 26 g. of potassium carbonate. The reaction product hereupon is reacted with 5.1 g. of sodium methoxide in 120 ml. of ethanol to yield the desired 1-phenyl-2,3-dioxo-4-propionyl-6-methyl-piperidine melting at 141–143° (diethyl ether).

*Example 21*

1.5 g. of 1-(4-methyl-phenyl)-2,3-dioxo-4 propionyl-piperidine dissolved in 15 ml. of ethanol are reacted with 0.7 g. of freshly crystallized and decolorized 2-hydrazine-pyridine (M.P. 48.50°) dissolved in 10 ml. of ethanol. The reaction mixture is worked up as described in Example 8 to yield the 2-(2-pyridyl)-3-ethyl-6-(4-methyl-phenyl)-7-oxo-4,5,6,7-teterahydro - 2H - pyrazolo[3,4-c]-pyridine of the formula

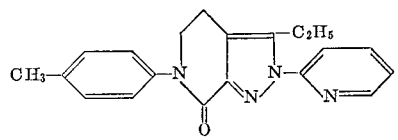

melting at 173–175° (acetone) and the 1-(2-pyridyl)-3-ethyl-6-(4-methyl-phenyl-7-oxo - 4,5,6,7 - tetrahydro-1H-pyrazolo[3,4-c]-pyridine as the ether soluble part.

*Example 22*

1.0 g. of 2-phenyl-3-ethyl-6-(4-methyl-phenyl)-7-oxo-4,5,6,7-tetrahydro-2H-pyrazolo[3,4-c]pyridine is reduced with 0.69 g. of lithium aluminum hydride in 50 ml. of diethyl ether and the reaction mixture worked up as shown in Example 9. There is obtained the 2-phenyl-3-ethyl-6-(4-methyl-phenyl)-4,5,6,7-tetrahydro - 2H - pyrazolo[3,4-c]pyridine of the formula

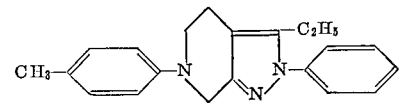

melting at 130–131° (pentane).

*Example 23*

100,000 tables each containing 25 mg. of the active ingredient.

Ingredients: G.
1 - (4 - fluoro - phenyl) - 3 - ethyl - 6-phenyl - 7 - oxo - 4,5,6,7 - tetrahydro-1H-pyrazolo[3,4-c]pyridine _____ 2,500.0
Lactose _____ 23,869.0
Corn starch _____ 1,342.0
Confectioners sugar _____ 2,000.0
Stearic acid _____ 289.0
Anhydrous ethanol, q.s.
Purified water, q.s.

*Preparation.*—The active ingredient is mixed with an equal portion of lactose, the mixture passed through a No. 16 screen and placed into a mixer. The remainder of the lactose, 770.0 g. of the corn starch, the confectioners sugar and the stearic acid are added and the powder mixed for twenty minutes. The remainder of the corn starch is suspended in cold water and a paste is formed by diluting the suspension with 3000 ml. of boiling water. The paste is added to the dry power mixture to form a granulate together with 200 ml. of ethanol-water 1:1. The wet mass is passed through a No. 5 screen, dried at about 43° and broken on a No. 12 screen. The granulate is compressed into tablets each weighing 0.3 g. using $^{11}/_{32}$ inch dies and standard concave punches.

In the same manner 100,000 tables, containing 50 mg. of 1-(4-fluoro-phenyl)-3-ethyl-6-(4-methyl-phenyl)-4,5,6,7 - tetrahydro-1H-pyrazolo[3,4-c)pyridine hydrochloride each, can be prepared by using 5,000.0 g. thereof, 21,869.0 g. lactose and the same amount of the other ingredients.

What is claimed is:
1. A member selected from the group consisting of bicyclic pyrazole compounds having the formulae

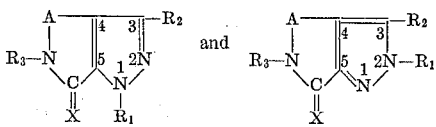

in which A is lower alkylene separating the nitrogen atom from the 4-position by 2 ring-carbon atoms, each of $R_1$, $R_2$ and $R_3$ is a member selected from the group consisting of hydrogen, lower alkyl, lower alkenyl, cycloalkyl and cycloalkyl-lower alkyl having from five to six ring-carbon atoms, lower alkoxy-lower alkyl, phenyl-lower alkyl, (lower alkyl)-phenyl-lower alkyl, (lower alkoxy)-phenyl-lower alkyl, (halogeno)-phenyl-lower alkyl, (trifluoromethyl)-phenyl-lower alkyl, (lower alkylmercapto)-phenyl-lower alkyl, (di-lower alkylamino)-phenyl-lower alkyl, phenyl, (lower alkyl)-phenyl, (lower alkoxy)-phenyl, (halogeno)-phenyl, (trifluoromethyl)-phenyl, (lower alkylmercapto)-phenyl, (di - lower alkylamino) - phenyl, pyridyl and (lower alkyl)-pyridyl, and X is a member selected from the group consisting of two hydrogen atoms and oxo, the N-oxides, quaternary lower alkyl ammonium derivatives and an acid addition salt thereof.

2. A member selected from the group consisting of compounds having the formulae

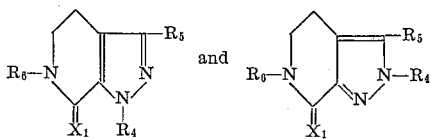

in which $X_1$ stands for a member selected from the group consising of two hydrogen atoms and oxo, $R_4$ for a member selected from the group consisting of hydrogen, lower alkyl, phenyl, (lower alkyl)-phenyl, (lower alkoxy)-phenyl, (halogeno)-phenyl, and (trifluoromethyl)-phenyl, $R_5$ for a member selected from the group consisting of lower alkyl and phenyl and $R_6$ for a member selected from the group consisting of phenyl, (lower alkyl)-phenyl, (lower alkoxy)-phenyl, (halogeno)-phenyl, and (trifluoromethyl)-phenyl, and an acid addition salt thereof.

3. A member selected from the group consisting of 1 - (4 - fluoro - phenyl) - 3 - ethyl - 6 - (4 - methyl-phenyl) - oxo - 4,5,6,7 - tetrahydro - 1H - pyrazolo[3,4 - c] pyridine, 2 - (4-fluoro-phenyl)-3-ethyl-6-(4-methyl-phenyl) - 7 - oxo - 4,5,6,7 - tetrahydro - 2H - pyrazolo[3,4 - c] pyridine and an acid addition salt thereof.

4. A member selected from the group consisting of 1 - phenyl - 3 - ethyl - 6 - (4 - methyl - phenyl) - 7 - oxo-4,5,6,7-tetrahydro-1H-pyrazolo[3,4-c]pyridine, 2-phenyl-3 - ethyl - 6 - (4 - methylphenyl) - 7 - oxo - 4,5,6,7 - tetrahydro-2H-pyrazolo[3,4-c]pyridine and an acid addition salt thereof.

5. A member selected from the group consisting of 3 - ethyl - 6 - (4 - methyl - phenyl) - 7 - oxo - 4,5,6,7-tetrahydro-1H-pyrazolo[3,4-c]pyridine and an acid addition salt thereof.

6. A member selected from the group consisting of 1 - methyl - 3 - ethyl - 6 - (4 - methyl - phenyl) - 7 - oxo-4,5,6,7-tetrahydro-1H-pyrazolo[3,4-c]pyridine, 2-methyl-3 - ethyl - 6 - (4 - methyl - phenyl) - 7 - oxo - 4,5,6,7-tetrahydro-2H-pyrazolo[3,4-c]pyridine and an acid addition salt thereof.

7. A member selected from the group consisting of 2 - phenyl - 6 - (4 - methyl - phenyl) - 7 oxo - 4,5,6,7-tetrahydro-1H-pyrazolo[3,4-c]pyridine and an acid addition salt thereof.

8. A member selected from the group consisting of 1 - (4 - fluoro-phenyl) - 3 - phenyl - 6 - (4 - methyl - phenyl) - 7 - oxo - 4,5,6,7 - tetrahydro - 1H - pyrazolo[3,4 - c] pyridine, 2-(4-fluoro-phenyl)-3-phenyl-6-(4-methyl-phenyl) - 7 - oxo - 4,5,6,7 -tetrahydro - 2H - pyrazolo[3,4-c] pyridine and an acid addition salt thereof.

9. A member selected from the group consisting of 1 - (4 - fluoro - phenyl) - 3 - ethyl - 6 - phenyl - 7 - oxo-4,5,6,7-tetrahydro-1-H-pyrazolo[3,4-c]pyridine, 2-(4-fluoro-phenyl) - 3 - ethyl - 6 - phenyl - 7 - oxo - 4,5,6,7 - tetrahydro-1H-pyrazolo[3,4-c]-pyridine and an acid addition salt thereof.

10. A member selected from the group consisting of 1 - (4 - fluoro - phenyl) - 3 - ethyl - 6 - phenyl - 4,5,6,7-tetrahydro-1H-pyrazolo[3,4-c]pyridine, 2-(4-fluoro-phenyl) - 3 - ethyl - 6 - phenyl - 4,5,6,7 - tetrahydro - 1H-pyrazolo[3,4-c]pyridine and an acid addition salt thereof.

11. A member selected from the group consisting of 1 - (4 - chloro - phenyl) - 3 - ethyl - 6 - phenyl - 7 -oxo-4,5,6,7 - tetrahydro - 1H - pyrazolo[3,4-c]-pyridine, 2-(4-chloro - phenyl) - 3 - ethyl - 6 - phenyl - 7 - oxo - 4,5,6, 7-tetrahydro-2H-pyrazolo[3,4-c]-pyridine and an acid addition salt thereof.

12. A member selected from the group consisting of 1 - (4 - methyl - phenyl) - 3 - ethyl - 6 - phenyl - 7 - oxo-4,5,6,7 - tetrahydro - 1H - pyrazolo[3,4-c]-pyridine, 2-(4-methyl - phenyl)-3 - ethyl - 6 - phenyl - 7 - oxo - 4,5,6,7-tetrahydro-2H-pyrazolo[3,4-c]-pyridine and an acid addition salt thereof.

13. A member selected from the group consisting of 1 - (4 - fluoro - phenyl) - 3 - ethyl - 6 - (4 - methyl - phenyl)-4,5,6,7-tetrahydro-1H-pyrazolo[3,4-c]-pyridine, 2-(4-fluoro-phenyl) - 3 - ethyl - 6 - ( 4 - methyl - phenyl) - 4,5, 6,7-tetrahydro-2H-pyrazolo[3,4-c]-pyridine and an acid addition salt thereof.

14. A member selected from the group consisting of 1 - (4 - fluoro - phenyl) - 3 - methyl - 6 - (4 - methyl-phenyl) - 7 - oxo - 4,5,6,7 - tetrahydro - 1H - pyrazolo [3,4-c]pyridine, 2-(4-fluoro-phenyl)-3-methyl-6-(4-methyl - phenyl) - 7 - oxo - 4,5,6,7 - tetrahydro - 2H - pyrazolo [3,4-c]pyridine and an acid addition salt thereof.

15. A member selected from the group consisting of 1 - (4 - fluoro - phenyl) - 3 - methyl - 6 - (4 - methylphenyl - 4,5,6,7 - tetrahydro - 1H - pyrazolo[3,4-c]pyridine, 2-(4-fluoro-phenyl)-3-methyl-6-(4-methyl-phenyl)-4,5,6,7-tetrahydro-2H-pyrazolo[3,4-c]pyridine and an acid addition salt thereof.

16. A member selected from the group consisting of 1 - (4 - fluoro - phenyl) - 3 - n - propyl - 6 - (4 - methyl-phenyl) - 7 - oxo - 4,5,6,7 - tetrahydro - 1H - pyrazolo [3,4-c]pyridine, 2-(4-fluoro-phenyl-3-n-propyl-6-(4-methyl - phenyl) - 7 - oxo - 4,5,6,7 - tetrahydro - 2H - pyrazolo [3,4-c]pyridine and an acid addition salt thereof.

17. A member selected from the group consisting of 1 - (4 - fluoro - phenyl) - 3 - n - propyl - 6 - (4 - methyl-phenyl) - 4,5,6,7 - tetrahydro- 1H - pyrazolo[3,4-c]pyridine, 2-(4-fluoro-phenyl)-3-n-propyl-6-(4-methyl-phenyl)-4,5,6,7-tetrahydro-2H-pyrazolo[3,4-c]pyridine and an acid addition salt thereof.

18. A member selected from the group consisting of 1 - (4 - fluoro - phenyl) - 3 - ethyl - 6 - (4 - methoxy - phenyl) - 7 - oxo - 4,5,6,7 - tetrahydro - 2H - pyrazolo[3,4-c] pyridine, 2-(4-fluoro-phenyl)-3-ethyl-6-(4-methoxy-phenyl) - 7 - oxo - 4,5,6,7 - tetrahydro - 2H - pyrazolo[3,4-c] pyridine and an acid addition salt thereof.

19. A member selected from the group consisting of 1 - (4 - fluoro - phenyl) - 3 - ethyl - 6 -(4 - methoxy-phenyl) - 4,5,6,7 - tetrahydro - 1H - pyrazolo[3,4 - c]-pyridine, 2-(4-fluoro-phenyl)-3-ethyl-6-(4-methoxy-phenyl)-4,5,6,7-tetrahydro-2H-pyrazolo[3,4-c]pyridine and an acid addition salt thereof.

20. A member selected from the group consisting of 1 - (4 - fluoro - phenyl) - 3 - ethyl - 5 methyl - 6 - phenyl-7 - oxo - 4,5,6,7 - tetrahydro - 1H - pyrazolo[3,4 - c]pyridine, 2-(4-fluoro-phenyl)-3-ethyl-5-methyl-6-phenyl-7- oxo - 4,5,6,7 - tetrahydro - 2H - pyrazolo[3,4 - c]pyridine and an acid addition salt thereof.

21. A member selected from the group consisting of 1 - (2 - pyridyl) - 3 - ethyl - 6 -(4 - methyl - phenyl) - 7-oxo - 4,5,6,7 - tetrahydro - 1H - pyrazolo[3,4 - c]pyridine, 2 - (2 - pyridyl) - 3 - ethyl - 6 - (4 - methyl - phenyl) - 7-oxo - 4,5,6,7 - tetrahydro - 2H - pyrazolo[3,4 - c]pyridine and an acid addition salts thereof.

22. A member selected from the group consisting of 1 - phenyl - 3 - ethyl - 6 - (4 - methyl - penhyl) - 4,5,6,7-tetrahydro-1H-pyrazolo[3,4-c]pyridine, 2-phenyl-3-ethyl-6 - (4 - methyl - phenyl) - 4,5,6,7 - tetrahydro - 2H - pyrazolo[3,4-c]pyridine and an acid additon salt thereof.

References Cited

UNITED STATES PATENTS 3,250,769  5/1966  Schmidt et al. _____ 260—247.1

FOREIGN PATENTS 964,750  7/1964  Great Britain.

JOHN D. RANDOLPH, *Primary Examiner.*

WALTER A. MODANCE, *Examiner.*

A. L. ROTMAN, *Assistant Examiner.*

UNITED STATES PATENT OFFICE
CERTIFICATE OF CORRECTION

Patent No. 3,365,459                      January 23, 1968

Herbert Morton Blatter

It is certified that error appears in the above identified patent and that said Letters Patent are hereby corrected as shown below:

Column 21, lines 5 to 10, the second formula should appear as shown below:

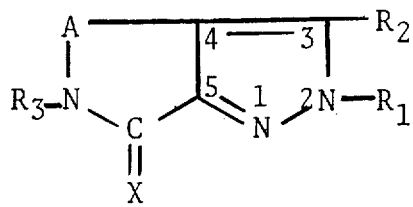

same column 21, line 51, "-oxo-" should read -- -7-oxo- --; line 72, "2-phenyl" should read -- 3-phenyl --; same line 72, "-7 oxo-" should read -- -7-oxo- --. Column 22, line 8, "1-H" should read -- 1H --; line 15, "1H-" should read -- 2H- --; line 51, "-phenyl-" should read -- -phenyl)- --; line 61, "2H-" should read -- 1H- --; line 73, "5 methyl" should read -- 5-methyl --. Column 23, line 6, "salts" should read -- salt --; line 10, "(4-methyl-penhyl)" should read -- (4-methyl-phenyl) --.

Signed and sealed this 17th day of February 1970.

(SEAL)
Attest:

EDWARD M. FLETCHER, JR.                WILLIAM E. SCHUYLER, JR.
Attesting Officer                       Commissioner of Patents